(12) United States Patent
Armbruster

(10) Patent No.: US 6,623,070 B2
(45) Date of Patent: Sep. 23, 2003

(54) ROOF ARRANGEMENT FOR A VEHICLE

(75) Inventor: Reiner Armbruster, Muehlacker (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/137,651

(22) Filed: May 3, 2002

(65) Prior Publication Data

US 2002/0171265 A1 Nov. 21, 2002

(30) Foreign Application Priority Data

May 5, 2001 (DE) .......................... 101 21 888

(51) Int. Cl.[7] ................................................ B60J 7/043
(52) U.S. Cl. ............................ 296/216.04; 296/216.01; 296/216.08
(58) Field of Search ..................... 296/216.01, 216.04, 296/216.06, 216.08, 216.09, 221, 222

(56) References Cited

U.S. PATENT DOCUMENTS

| | | | |
|---|---|---|---|
| 5,026,113 A | * 6/1991 | DiCarlo et al. | 296/221 |
| 5,048,889 A | * 9/1991 | Hattass et al. | 296/216.08 |
| 5,052,746 A | * 10/1991 | Reihl et al. | 296/222 |
| 5,156,435 A | * 10/1992 | Farmont | 296/216.06 |
| 6,224,147 B1 | * 5/2001 | Farber et al. | 296/216.04 |

FOREIGN PATENT DOCUMENTS

| | | |
|---|---|---|
| DE | 4336222 C1 | 11/1994 |
| DE | 4335653 A1 | 4/1995 |
| DE | 19713348 C1 | 7/1998 |
| DE | 19938605 C1 | 10/2000 |
| EP | 0403734 A2 | 12/1990 |
| EP | 0899140 A1 | 3/1999 |

* cited by examiner

Primary Examiner—D. Glenn Dayoan
Assistant Examiner—Lori Coletta
(74) Attorney, Agent, or Firm—Crowell & Moring LLP

(57) ABSTRACT

A roof arrangement for a vehicle, which is particularly useful in a passenger car, has a roof frame, a sliding cover, and two lateral guideways, in which the sliding cover is movably guided for closing or at least partially exposing a roof opening. The sliding cover interacts with several bearing devices. Each bearing device, on one side, is linked to the sliding cover and, on the other side, is supported by way of a guiding element in one of the guideways. Each of the bearing devices has a lever arrangement which is fastened to the guiding element as well as to the sliding cover in a pivot bearing. In order to avoid bearing device rattling noise when the sliding cover is open, the lever arrangement is supported in its pivot bearing against at least one of the guiding element and the sliding lid by way of an elastic element made of a rubber-elastic material.

25 Claims, 1 Drawing Sheet

ROOF ARRANGEMENT FOR A VEHICLE

This application claims the priority of German application 101 21 888.5, filed May 5, 2001, the disclosure of which is expressly incorporated by reference herein.

The present invention relates to a roof arrangement for a vehicle, particularly for a passenger car, including a roof frame, a sliding cover, two lateral guideways in which the sliding cover is movably guided for closing or at least partially exposing a roof opening, and bearing devices with which the sliding cover interacts. Each of the bearing devices is linked, on one side, to the sliding cover and, on the other side, is supported by way of a guiding element in one of the guideways. Each of the bearing devices has a lever arrangement which is fastened to the guiding element as well as to the sliding cover in a pivot bearing.

From German Patent Document DE 43 35 653 A1, a roof arrangement of the above-mentioned type is known for a passenger car. The roof arrangement has a roof frame and a sliding cover which is movably guided in two lateral guideways and used for closing or exposing a roof opening in the vehicle. Several bearing devices are linked to the sliding cover. Each bearing device is respectively supported in one of the guideways by way of one guiding element. Each of at least two of the bearing devices has a lever arrangement which is respectively fastened to the guiding element and on the sliding cover in one pivot bearing. When the roof opening is to be exposed, the sliding cover will be tilted or lowered by way of the lever arrangement about a tilting axis extending parallel to the transverse axis of the vehicle and will then be slid against the driving direction under a stationary roof part.

German Patent Document DE 199 38 605 C1 describes a bearing device for a rigid sliding cover which has a guiding element movable in a guideway. A bolt engages in a bolt receiving device of the cover and is supported with respect to the cover by way of a prestressed coil spring. It is a disadvantage of this embodiment that a ring-shaped supporting surface for the coil spring has to be established in each case in the bolt receiving device and on the bolt, which increases the manufacturing costs of the roof arrangement.

It is therefore an object of the invention to provide a roof arrangement of the initially mentioned type in which rattling noises are at least reduced while driving the vehicle, particularly when the sliding cover is open.

This object is achieved by supporting a lever arrangement of the roof arrangement on its pivot bearing against at least one of the guiding element and the sliding cover by way of an elastic element made of a rubber-elastic material. Additional advantageous characteristics of the invention are reflected in dependent claims.

Principal advantages achieved by the invention include at least a reduction in disturbing noises, such as rattling. The rubber-elastic element, which is inserted during mounting of the roof arrangement, is advantageously suitable for this purpose. Furthermore, additional costly treatments of the bearing device or of the sliding.cover are eliminated.

In the following, the invention will be explained in detail with reference to the drawings.

DETAILED DESCRIPTION OF THE INVENTION

Figure 1:
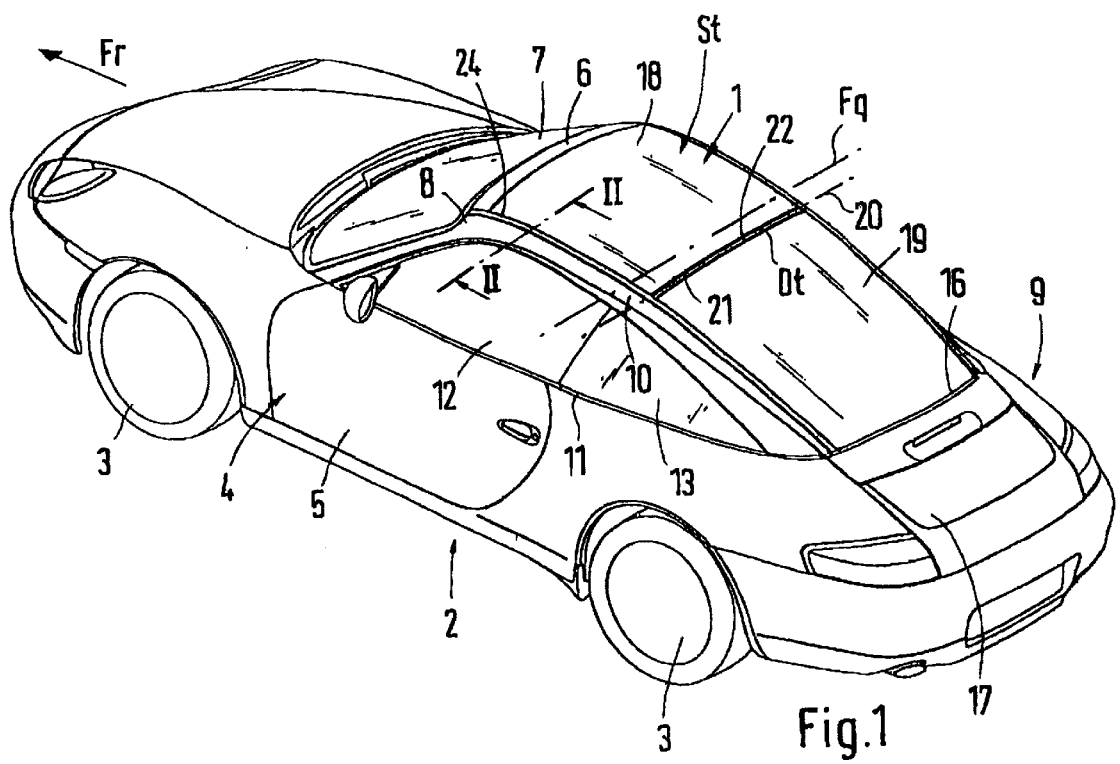
FIG. 1 is a view of a passenger car having a roof arrangement.
Figure 2:
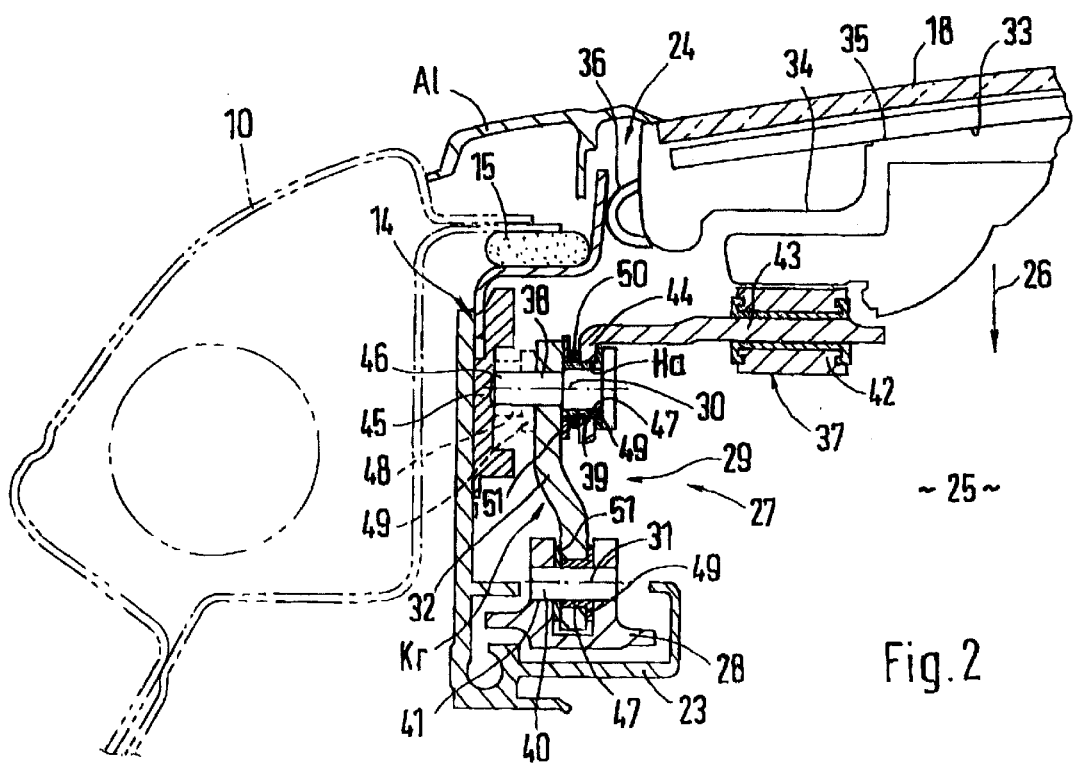
FIG. 2 is a sectional view of the roof arrangement along line II—II in FIG. 1.

By way of FIGS. 1 and 2, a roof arrangement 1 which is provided on a vehicle 2, particularly on a passenger car, is described. The roof arrangement comprises a body 4 carried by wheels 3. The body 4 has a basic body 5 and a windshield frame 6 into which a windshield 7 is inserted. From the upper corners 8 of the windshield frame 6, lateral roof frame rails 10 of the body 4 extend in the direction of the rear 9. These roof frame rails 10 extend in an approximately curved manner, so that the body 4 has the shape of a coupe with a fast back. Side windows 12 and 13 are inserted between the lateral roof frame rails 10 and a belt line 11 of the body 4, which is situated underneath.

The roof arrangement 1 is arranged between the lateral roof frame rails 10 and—according to FIG. 2—has a roof frame 14 which is connected with the body 4, for example, by a surrounding gluing 15. The roof frame 14 is preferably constructed in a surrounding manner and extends from the windshield frame 6 to a forward edge area 16 in front of an engine compartment access flap 17. However, it would also be conceivable for the lateral roof frame rails 10 to form the roof frame.

The roof arrangement 1 has at least one—viewed in the driving direction Fr—forward displaceable sliding cover 18 which may have a rigid construction and which—in the closed position St (FIG. 1)—adjoins the windshield frame 6. The roof arrangement also has a rearward roof part 19 which is preferably non-displaceably fastened to the body 4 or to the roof frame 14. In a preferred embodiment, the rearward roof part 19 of the roof arrangement 1 is the rear window of the vehicle. It may be provided that the rearward roof part 19 can be opened about a tilting axis 20 which extends parallel to the transverse vehicle axis Fq. Preferably, only a seal Dt is provided between the rearward edge 21 of the sliding cover 18 and the forward edge 22 of the rearward roof part 19.

The—preferably transparent—sliding cover 18 is movably guided in lateral guideways 23, which can be mounted at the roof frame 14 or at the frame rails 10, for closing or at least partially exposing a roof opening 24 such that the sliding cover 18 can be deposited under the rearward roof part 19. For this purpose, the sliding cover 18 is lowered first in the direction of the vehicle interior 25 in the direction of the arrow 26 and subsequently displaced toward the rear under the roof part 19. For lowering the sliding cover in the direction of the arrow 26, the sliding cover 18 is supported by way of several bearing devices 27 in the guideways 23 permitting a swivelling movement of the cover 18. Two bearing devices 27—arranged behind one another in the driving direction Fr—are preferably slidingly guided in each guideway 23. Each bearing device 27 is supported, on one side, on the sliding cover, and, on the other side, by way of a guiding element 28 in one of the guideways 23. Each bearing device 27 has a lever arrangement 29 which is rotatably linked to the guiding element 28 as well as to the sliding cover 18 in a swivelling or pivot bearing 30 or 31. The lever arrangement 29 comprises at least one lever 32 which is swivellably disposed in the pivot bearings 30 or 31 and which may have a right-angle bend Kr. As a result of the lever arrangement 29, the sliding cover 18 can be lowered in the direction of the arrow 26. It can then be moved along the guideways toward the rear under the roof part 19.

On its side 33 facing the vehicle interior 25, the sliding cover 18 has a supporting frame 34 which is fastened to the interior side 33 of the cover. The supporting frame 34 is provided in the cover edge area 35 and extends preferably completely around in this cover edge area 35. A seal 36, which extends around the edge of the cover 18 and seals off the sliding cover 18 toward the boundary of the roof opening 24, may be mounted on the supporting frame 34. The seal Dt may be a component of the seal 36. A covering strip Al can span the free space between the roof frame rail 10 and the cover 18 over the seal 36.

The bearing device 27 has a bearing block 37 which is fastened to the supporting frame 34 or constructed in one piece with the latter. The lever arrangement 29 is rotatably fastened with a first bearing axis 38 of the upper pivot bearing 30 in a bearing eye 39 of the bearing block 37. In addition, the lever arrangement 29 is rotatably fastened with a second bearing axis 40 in a bearing eye 41 of the lower pivot bearing 31. The bearing axes 38 and 40 extend parallel to the transverse axis Fq of the vehicle. The lever arrangement 29 is therefore swivellably connected with the sliding cover 18 as well as with the guiding element 28. The bearing block 37 preferably has a bearing console 42 which is connected with the supporting frame 34. A tilt-out arm 43 is fitted into the bearing console 42, is fastened therein, extends in the direction of the roof frame 14, and has the bearing eye 39 at its free end 44 which is bent downward.

A control path 45 is provided for controlling the movement in the direction of the arrow 26 of the sliding cover 18. The control path 45 is arranged laterally on the roof frame 14, and a control bolt 46 engages into the control path. The control bolt 46 and the first bearing axis 38 are preferably constructed in one piece as a continuous bolt which penetrates the lever arrangement 29 and is guided by its one end in the control path 45 and rotatably held in the bearing eye 39, preferably by inserting a bearing sleeve, particularly a slide bush 47. A bearing sleeve, particularly a slide bush 47, can also be inserted into the bearing eye 41. In addition, another bearing sleeve, preferably a slide bush 48 (illustrated by a broken line in FIG. 2), can also be arranged on the end of the control bolt 46 guided in the control path 45. The slide bushes 47 and 48, of a slide bearing material, have, in addition to the sleeve section Ha, a ring collar 49.

In order to avoid or at least reduce rattling noises, particularly of the bearing device 27 and/or of the lever SF arrangement 29, and particularly when the roof opening 24 is exposed, the lever arrangement 29 is supported in at least one of its pivot bearings 30 or 31 against the guiding element 28 or the sliding cover 18 by way of an elastic element 50. The elastic element is made of a rubber-elastic material. The elastic element 50 is preferably fitted onto the first and/or second bearing axis 38 and/or 40 and is situated between the lever 32 and the corresponding bearing eye 39 or 41 of the bearing block 37 or the guiding element 28.

The elastic element 50 is preferably constructed as a ring, particularly an O-ring or a ring disk, and may be arranged on the bearing axis 38 or 40 or the sleeve section Ha of the slide bush 47 or 48. So that the rubber-elastic element 50 is not damaged during a relative movement between the lever 32 and the tilt-out arm 43, preferably a bearing disk, particularly a slide bearing disk 51, is provided which is arranged between the element 50 and the lever 32 or the bearing eye 39. In addition or as an alternative to the element 50 arranged between the lever 32 and the tilt-out arm 43, such an element 50 can also be arranged-between the ring collar 49 and the lever 32. It would also be conceivable to fit the element 50 onto the bearing axis 40.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A roof arrangement for a vehicle, particularly for a passenger car, comprising:
    a roof frame,
    a sliding cover,
    two lateral guideways in which the sliding cover is movably guided for closing or at least partially exposing a roof opening, and
    bearing devices with which the sliding cover interacts, each of the bearing devices being linked on one side to the sliding cover and, on the other side, supported by way of a guiding element in one of the guideways,
    the bearing devices each having a lever arrangement which is fastened to the guiding element as well as to the sliding cover in a pivot bearing,
    wherein the lever arrangement is supported on its pivot bearing against at least one of the guiding element and the sliding cover by way of an elastic element made of a rubber-elastic material.

2. The roof arrangement according to claim 1, wherein the sliding cover comprises, on its side facing the vehicle interior, a completely surrounding supporting frame fastened to a cover edge area.

3. The roof arrangement according to claim 1, wherein each bearing device has a bearing block which is either fastened to the supporting frame or constructed in one piece with the supporting frame, and wherein the lever arrangement is rotatably fastened by way of a first bearing axis in a bearing eye of the bearing block and by way of a second bearing axis in a bearing eye of the respective guiding element.

4. The roof arrangement according to claim 3, wherein the elastic element is arranged on at least one of the first and second bearing axes and is situated between the lever arrangement and the bearing block or the guiding element.

5. The roof arrangement according to claim 3, wherein the first bearing axis reaches through the lever arrangement and engages by way of its end facing away from the bearing block in a control path controlling sliding cover movement.

6. The roof arrangement according to claim 3, wherein the bearing block has a bearing console and a tilt-out arm which extends from the bearing console in the direction of the roof frame and which has the bearing eye for receiving the first bearing axis at its end adjacent to the roof frame.

7. The roof arrangement according to claim 3, and further comprising a slide bearing sleeve, surrounding one of the bearing axes, inserted into the bearing eye for the one of the bearing axes.

8. The roof arrangement according to claim 3, and further comprising a slide bearing disk arranged on the first bearing axis or the second bearing axis.

9. The roof arrangement according to claim 8, wherein the slide bearing disk and the elastic element are arranged side-by-side on the bearing axis and between the lever arrangement and the bearing eye.

10. The roof arrangement according to claim 1, wherein the elastic element is constructed as an O-ring.

11. The roof arrangement according to claim 2, wherein each bearing device has a bearing block which is either fastened to the supporting frame or constructed in one piece with the supporting frame, and wherein the lever arrangement is rotatably fastened by way of a first bearing axis in a bearing eye of the bearing block and by way of a second bearing axis in a bearing eye of the respective guiding element.

12. The roof arrangement according to claim 11, wherein the elastic element is arranged on at least one of the first and second bearing axes and is situated between the lever arrangement and the bearing block or the guiding element.

13. The roof arrangement according to claim 11, wherein the first bearing axis reaches through the lever arrangement and engages by way of its end facing away from the bearing block in a control path controlling sliding cover movement.

14. The roof arrangement according to claim 11, wherein the bearing block has a bearing console and a tilt-out arm which extends from the bearing console in the direction of the roof frame and which has the bearing eye for receiving the first bearing axis at its end adjacent to the roof frame.

15. The roof arrangement according to claim 11, and further comprising a slide bearing sleeve, surrounding one of the bearing axes, inserted into the bearing eye for the one of the bearing axes.

16. The roof arrangement according to claim 11, and further comprising a slide bearing disk arranged on the first bearing axis or the second bearing axis.

17. The roof arrangement according to claim 16, wherein the slide bearing disk and the elastic element are arranged side-by-side on the bearing axis and between the lever arrangement and the bearing eye.

18. The roof arrangement according to claim 2, wherein the elastic element is constructed as an O-ring.

19. The roof arrangement according to claim 3, wherein the elastic element is constructed as an O-ring.

20. The roof arrangement according to claim 4, wherein the elastic element is constructed as an O-ring.

21. The roof arrangement according to claim 5, wherein the elastic element is constructed as an O-ring.

22. The roof arrangement according to claim 6, wherein the elastic element is constructed as an O-ring.

23. The roof arrangement according to claim 7, wherein the elastic element is constructed as an O-ring.

24. The roof arrangement according to claim 8, wherein the elastic element is constructed as an O-ring.

25. The roof arrangement according to claim 9, wherein the elastic element is constructed as an O-ring.

\* \* \* \* \*